Figure 1:
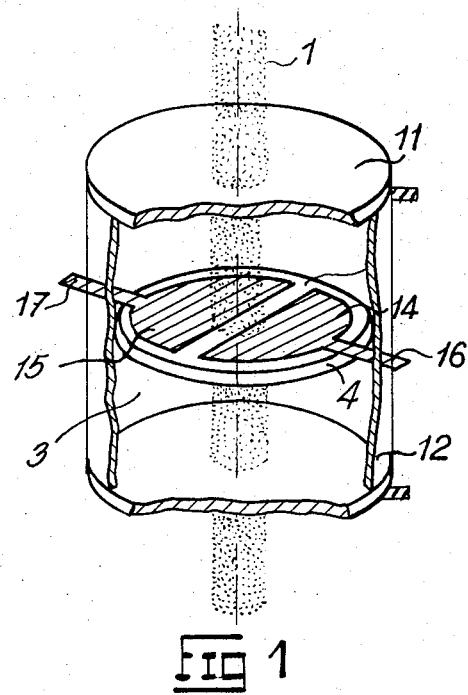

United States Patent [19]
Boux

[11] 3,808,441
[45] Apr. 30, 1974

[54] DEVICES FOR MEASURING THE DOSE RATE OF A BEAM OF IONISING RADIATION

[75] Inventor: Rene Boux, Paris, France

[73] Assignee: Thomson-CSF, Paris, France

[22] Filed: Apr. 12, 1972

[21] Appl. No.: 243,208

[30] Foreign Application Priority Data
Apr. 30, 1971  France .............................. 71.15608

[52] U.S. Cl. ................... 250/397, 250/385, 313/93
[51] Int. Cl. ............................................. G01t 1/16
[58] Field of Search ... 250/83.6 R, 49.5 E, 49.5 PE, 250/385, 397; 313/93

[56] References Cited
UNITED STATES PATENTS
2,741,709   4/1956   Tirico et al. ................... 250/83.6 R
3,372,279   3/1968   Engh et al. ...................... 250/83.6 R
3,414,726   12/1968  Chameroy ....................... 250/83.6 R
3,626,184   12/1971  Crewe ......................... 250/49.5 E X
3,626,189   12/1971  Berg ............................. 250/83.6 R Primary Examiner—Archie R. Borchelt
Attorney, Agent, or Firm—Cushman, Darby & Cushman

[57] ABSTRACT

The device, particularly concerned with medical accelerators, comprises two identical ionisation chambers, each comprising a pair of insulated semi-circular collector electrodes arranged between two end walls, the insulating strips, separating each said pairs of electrodes being perpendicular to one another, each pair of electrodes being perpendicular to the direction of beam propagation.

6 Claims, 3 Drawing Figures

DEVICES FOR MEASURING THE DOSE RATE OF A BEAM OF IONISING RADIATION

The present invention relates to irradiation systems and relates more particularly to devices for measuring the "dose rate" of the irradiation beams of $\beta$ or $\gamma$ type.

Throughout the following description, beams of this kind will be referred to indiscriminately as "ionizing radiation," without specific reference to either family, their respective physical effects as employed in the device in accordance with the invention, being the same.

The "dose rate" of beams of this kind of radiation is defined as the quantity (or "dose") of electro-magnetic radiation, expressed in roentgens, received per unit time by a target bombarded by such a beam.

A device for measuring the dose rate of a beam must, in addition to information concerned with rate measurement, supply information on the position and uniformity of the beam. Conventional devices employed for this purpose are ionization chambers comprising an insulated collector electrode of circular form arranged between two plates, the system being approximately perpendicular to the beam direction. The positioning information is obtained by comparison of the electrical signals produced by each of the four insulated quadrants of the collector electrodes; the rate information is produced by the addition of the electrical signals, coming from said quadrants.

For safety reasons, international regulations, concerned with this field, prescribe that any dose rate measuring device shall embody two separate dose rate measuring systems in order to enable immediate detection of the failure of one of them. This is generally achieved by addition of a second ionization chamber whose collector electrode is not necessarily split up into insulated quadrants, this second chamber being designed solely to measure the dose rate.

A drawback of this kind of devices resides in the use of two ionization chambers whose structures are totally different from one another, associated with separate circuits, this complicating manufacture and considerably increasing the cost.

It is an object of this invention to provide a device for measuring the dose rate of a beam of ionizing radiation.

According to the invention, there is provided a device for measuring the dose rate of a beam of ionizing radiation and for positioning the path of said beam, said device comprising: two identical ionization chambers each comprising a first and a second end walls transparent to said beam and two identical coplanar electrodes also transparent to said beam and positioned intermediate said walls an insulating strip separating said electrodes from each other, said chambers being located along the same axis, one chamber being so positioned with respect to the other that said strips separating the electrodes of each said pairs are at an angle with respect to each other.

Figure 2:
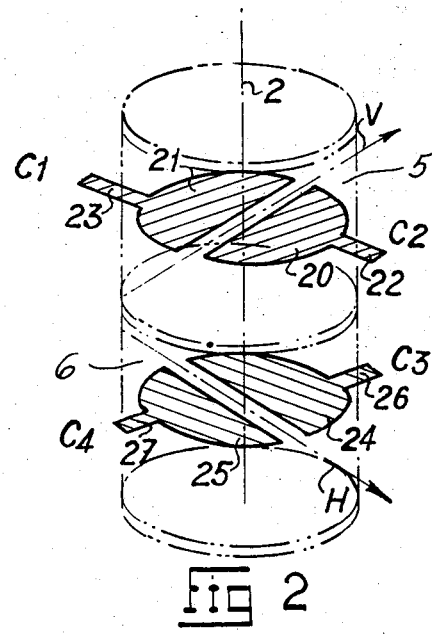
Figure 3:
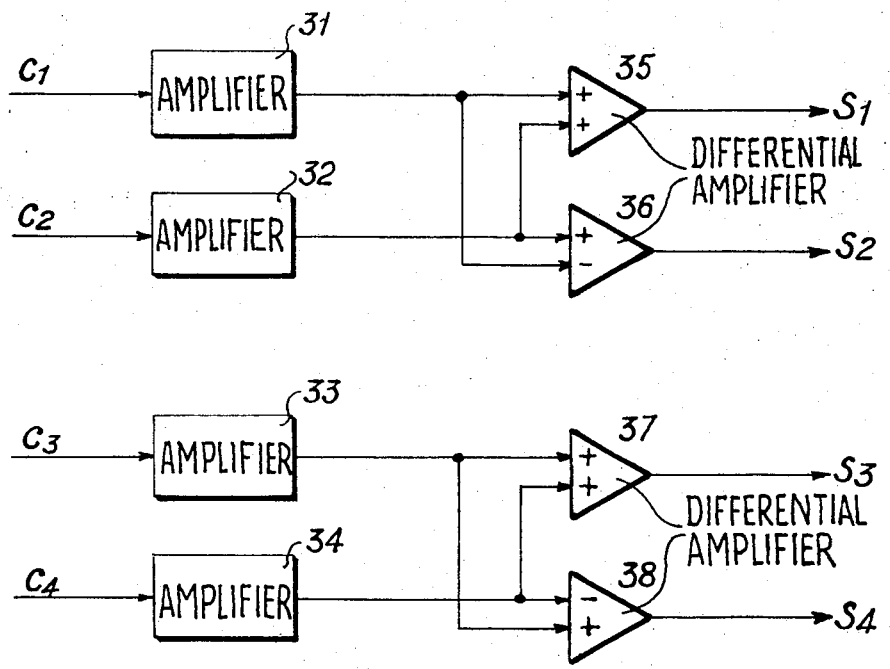

For a better understanding of the invention and to show how the same may be carried into effect reference will be made to the drawings accompanying the following description and in which:

FIG. 1 illustrates an embodiment of an ionization chamber in the measuring device in accordance with the invention;

FIG. 2 schematically illustrates the arrangement of the collector electrodes in the ionization chambers of the measuring device in accordance with the invention FIG. 3 is the diagram of the circuits which process the electrical signals produced by the collector electrodes of the measuring device in accordance with the invention.

FIG. 1 illustrates an embodiment of one of the ionization chambers forming the measuring device in accordance with the invention. This chamber 3 comprises two end walls 11 and 12 and a pair of collector electrodes 14 and 15 which are transparent to a beam 1 of ionization radiation and disposed approximately perpendicularly to the direction of this beam 1.

The pair of collector electrodes 14 and 15 is made up of an insulating support 4 preferably in the form of a very flat disc, covered on each of its two faces by metal deposits and of semicircular form, insulated each other and electrically connected with the external circuit by leads 16 and 17. These electrodes can be produced by the deposition of aluminium on a sheet of the plastic material known as "Mylar." The electrodes 14 and 15 are separated by an insulating band 13.

In operation, the end walls 11 and 12 are connected to the same high-voltage terminal, the pair of collector electrodes 14 and 15 being connected to the other terminal; in one embodiment, the end walls 11 and 12 are at a positive potential of 300 volts and the collector electrode earthed.

The ionization of the gas enclosed in the chamber 3 is due to the passage of the beam 1 through this chamber 3. This ionization produces an electric current in the electrodes 14 and 15 which collect charged particles. In the bias arrangement described in the above example, the electrodes 14 and 15 collect the ions resulting from the ionization process. Since the ions collector is constituted by a pair of electrodes 14 and 15, the comparison, for example by differentiation, of the currents produced in the leads 16 and 17 during the passage of the beam 1, supplies information on the one hand about the uniformity of the beam 1 and on the other hand about its position with respect to the electrodes 14 and 15.

The device in accordance with the invention for measuring the dose rate of the beam of ionizing radiation, is constituted by two ionization chambers 5 and 6 identical to the chamber 3 shown in FIG. 1. FIG. 2 illustrates a schematic view of the respective positions of the two pairs of collector electrodes 20, 21 and 24, 25 in these two ionization chambers 5 and 6.

These two pairs of collector electrodes 20, 21 and 24, 25, identical to the pair of electrodes 14 and 15 of FIG. 1, are respectively provided with the leads 22 and 23, and with the leads 26 and 27. These electrodes 20, 21 and 24, 25 are arranged perpendicularly to the axis of symmetry 2 of the system and so that the respective axes of separation V and H of electrodes 21, 22 and 24, 25 are perpendicular to one another.

The operation of a device comprising two ionization chambers 5 and 6 as shown in FIG. 2, is as follows: when a beam of ionizing radiation propagates along the axis 2, as indicated hereinbefore, currents $C_1$, $C_2$, $C_3$ and $C_4$ respectively flow in the electrodes 20, 21, 24, 25. The comparison of the currents $C_1$ and $C_2$ as described hereinbefore, provides information about the position of the beam in relation to the axis V of the band separating the electrodes 20 and 21. Similarly, the currents $C_3$ and $C_4$, by comparison, provide information about the position of the beam in relation to the axis H. The position of the beam 1 with respect to the axis of symmetry 2 of the device is thus fully determined.

FIG. 3 illustrates schematically the circuit in which the current $C_1$, $C_2$, $C_3$ and $C_4$, produced by the collector electrodes 20, 21 and 24, 25 are processed.

Each of the currents $C_1$, $C_2$, $C_3$, and $C_4$ is processed through a circuit comprising an impedance-matching device, for example an amplifier 31 to 34, in series with a differential amplifier, 35 to 38, each having two inputs; the information signals $S_1$ to $S_4$ are obtained at the outputs of the respective circuits.

In operation, the differential amplifiers 35 and 37 being used as adders, the outputs $S_1$ and $S_3$ constitute the measurements of the dose rate obtained independently by the first and second ionization chambers.

As stated hereinbefore, the dose rate is identical to the sum of the currents in the collector electrodes 20, 21 and 24, 25. The outputs $S_2$ and $S_4$ provide the information concerning the positioning of the beam 1 in relation to the axis of symmetry 2 (FIG. 2). To this end, the differential amplifier 36 forms the difference between the signals $C_2$ and $C_1$ and the electrical signal $S_2$ represents the displacement of the beam on both sides of the axis V. Similarly, the differential amplifier 38 forms the difference between the signals $C_3$ and $C_4$ and the signal $S_4$ represents the displacement of the beam in relation to the axis H.

The measuring device in accordance with the invention thus makes it possible to obtain two separate dose rate measurements and the information concerning the position of the beam, by means of two identical systems (ionization chamber and measuring circuits).

The device also makes it possible to reduce the number of impedance-matching systems with respect to the prior art devices which require four impedance-matching systems for the first chamber and one for the second, this second chamber carrying out the dose rate measurement.

Another advantage of the device in accordance with the invention is its improvement of the signal-to-noise ratio, since the signal produced by one electrode is double that produced by a quadrant, under the same conditions, and since the noise component is the same for an electrode as for a quadrant, if the causes of noise are unrelated to the rate measurement.

By way of example, the device in accordance with the invention, having two ionization chambers whose end walls are at + 300 volts, a pulsed beam of electrons with energies ranging between 7 and 32 MeV, or a pulse beam of photons with energies equivalent to 25 MeV, passing therethrough has produced a mean current comprised between 30 and 500 nA.

The device in accordance with the invention can be utilized for measuring the dose rate of any ionizing radiation beam constituted by a charged or no-charged particles, for example the beams used in medical accelerators.

What I claim is:

1. A device for measuring the dose rate of a beam of ionizing radiation and for positioning the path of said beam, said device comprising: two identical ionization chambers each comprising a first and a second end walls transparent to said beam and a pair of identical coplanar electrodes also transparent to said beam and positioned intermediate said walls; an insulating strip separating said electrodes from each other; said chamber being located along the same axis; one chamber being so positioned with respect to the other that said strips separating the electrodes of each said pairs are at angle with respect to each other.

2. A device as claimed in claim 1, wherein said walls and said pairs of electrodes are in parallel planes.

3. A device as claimed in claim 1, wherein said strips are at right angles with respect to each other.

4. A device as claimed in claim 2, wherein said walls are circular and said electrodes sensibly semi-circular.

5. A device as claimed in claim 1, further comprising means for collecting the signals generated in said electrodes upon propagation of said beam through said chambers.

6. A device as claimed in claim 5, wherein said means comprise means respectively associated with said chambers for adding to and substracting from each other the signals generated, upon propagation of said beam through said chambers, in said pair of electrodes of each of said chambers.

* * * * *